United States Patent
Ando et al.

(10) Patent No.: US 7,802,726 B2
(45) Date of Patent: Sep. 28, 2010

(54) MOBILE TERMINAL DEVICE AND DATA ACQUISTION METHOD USING THE SAME

(75) Inventors: Tomohiro Ando, Yokohama (JP); Naoki Yamane, Tokyo (JP); Hiroshi Kawabata, Sapporo (JP); Satoshi Washio, Sapporo (JP)

(73) Assignee: NTT DoCoMo, Inc., Tokyo (JP)

( * ) Notice: Subject to any disclaimer, the term of this patent is extended or adjusted under 35 U.S.C. 154(b) by 386 days.

(21) Appl. No.: 11/667,218

(22) PCT Filed: Nov. 7, 2005

(86) PCT No.: PCT/JP2005/020385
§ 371 (c)(1),
(2), (4) Date: Jan. 24, 2008

(87) PCT Pub. No.: WO2006/051759
PCT Pub. Date: May 18, 2006

(65) Prior Publication Data
US 2008/0290158 A1 Nov. 27, 2008

(30) Foreign Application Priority Data
Nov. 9, 2004 (JP) ............................. 2004-324798

(51) Int. Cl.
*G06K 7/10* (2006.01)

(52) U.S. Cl. ................................................. 235/472.01

(58) Field of Classification Search ................................. 235/472.01–472.03
See application file for complete search history.

(56) References Cited

U.S. PATENT DOCUMENTS

| | | | |
|---|---|---|---|
| 6,910,624 B1 | 6/2005 | Natsuno | |
| 7,066,385 B2 * | 6/2006 | Fukada et al. | 235/380 |
| 7,184,706 B2 * | 2/2007 | Someya et al. | 455/41.2 |
| 2003/0135748 A1 | 7/2003 | Yamada et al. | |

FOREIGN PATENT DOCUMENTS

| | | |
|---|---|---|
| JP | 2003-076958 | 3/2003 |
| JP | 2003-198718 | 7/2003 |
| JP | 2003-296233 | 10/2003 |
| JP | 2004-309836 | 11/2004 |
| TW | 479187 | 3/2002 |

* cited by examiner

*Primary Examiner*—Jamara A Franklin
(74) *Attorney, Agent, or Firm*—Michaud-Kinney Group LLP (57) ABSTRACT

In a system according to the invention, a communication section of a mobile terminal detects a carrier from an external R/W, starts communication with the external R/W, and acquires content simplified data of contactless card function content from the external R/W. The acquired content simplified data is transferred to a control section using the contactless card function content and stored. Further, in this system, by connecting to a URL contained in the content simplified data, content body data of the contactless card function content corresponding to the content simplified data is downloaded and stored in the mobile terminal.

10 Claims, 8 Drawing Sheets

MOBILE TERMINAL DEVICE AND DATA ACQUISTION METHOD USING THE SAME

TECHNICAL FIELD

The present invention relates to a mobile terminal device and data acquisition method using the device, and more particularly, to a mobile terminal device installed with a contactless card function and a method of acquiring arbitrary data with ease using the contactless card function.

BACKGROUND ART

With the sophistication in function of mobile terminal devices, such a case increases that various kinds of data are acquired using the mobile terminal device. It is generally carried out that content is downloaded via the Internet using a packet network and the like. Further, it is possible to attach some kind of data to an e-mail to transmit and receive. Furthermore, recently, data has been transmitted and received using infrared communication and two-dimensional bar code (Japanese Unexamined Patent Publication No. 2003-296233).

In recent years, mobile terminal devices installed with IC card functions have spread widely. Delivery and receipt of data using the IC card functions can be performed when the power supply is off on the mobile terminal device side, or can be executed only by holding the mobile terminal device over an external R/W, and thus is easy for a user to operate.

However, these IC card functions of the mobile terminal device are implemented using communication between the external R/W and an IC card function section of the mobile terminal device, and generally, are not associated with the mobile terminal operating system (OS) of the mobile terminal device. Accordingly, the content retrieved by the IC card function is not able to work in conjunction with an application operating on the mobile terminal OS, for example, i application (Trademark) except a specific application associated with the content such as, for example, a Java (Trademark) application and BREW (Trademark) application.

It is an object of the invention to provide a mobile terminal device and data acquisition method using the device enabling content retrieved by the IC card function to operate in conjunction with an application other than a specific application operating on a mobile terminal OS.

SUMMARY OF THE INVENTION

A mobile terminal device of the invention has a terminal body having an operating system, a contactless card function section that is provided in the terminal body and that acquires contactless card function content from an external apparatus, and a contactless card function control section that operates on the operating system and that performs control to use the contactless card function content.

According to this configuration, by using the contactless card function section as a pipe to retrieve contactless card function content, it is possible to deliver the contactless card function content to the contactless card function control section operating on the mobile terminal OS. It is thereby possible to operate the content retrieved by the contactless card function in conjunction with an application other than a specific application operating on the mobile terminal OS such as a Java (Trademark) application and BREW (Trademark) application.

In the mobile terminal device of the invention, it is preferable that the contactless card function control section has a management section that performs management according to an attribute of the contactless card function content. According to this configuration, it is possible to perform sort processing and search processing with ease.

In the mobile terminal device of the invention, the management section preferably manages the contactless card function content using an arbitrary code corresponding to the contactless card function content. According to this constitution, it is possible to decrease the data amount of managed data. Further, by using arbitrary codes corresponding to a variety of contactless card function content, for example, icon code, regional code and the like, it is possible to perform a display easily readable for the user on a screen.

In the mobile terminal device of the invention, it is preferable that the contactless card function content includes content simplified data and content body data, and that the contactless card function control section has a storage section that stores the content simplified data acquired from the external apparatus.

In the mobile terminal device of the invention, it is preferable that the content simplified data includes a URL to access to acquire the content body data, the device has a communication control section to connect to the URL, and that the storage section stores the content body data acquired by connecting to the URL. According to this constitution, it is possible to obtain more detailed data than the content simplified data, i.e. the content body data.

In the mobile terminal device of the invention, it is preferable that the contactless card function control section has a section that performs control to import or export the content body data and/or the content simplified data to/from external memory. According to this constitution, it is possible to deliver and/or receive Toruca data to/from the external apparatus.

A data acquisition method of the invention is a data acquisition method of acquiring content simplified data of contactless card function content in a mobile terminal device from an external apparatus, and has the steps of transferring the content simplified data to a contactless card function section from the external apparatus, and storing the content simplified data in a storage section of a contactless card function control section operating on an operating system of the mobile terminal device.

According to this method, it is possible to deliver the content simplified data acquired from the external apparatus to a processing section operating on the mobile terminal operating system. It is thereby possible to operate the content simplified data in conjunction with an application other than a specific application operating on the mobile terminal OS such as a Java (Trademark) application and BREW (Trademark) application. Further, since the contactless card function is used as an interface of information communication, the need is eliminated of beforehand starting the specific application on the mobile terminal device side, and data can be acquired even when the mobile terminal device is off.

In the data acquisition method of the invention, it is preferable that the content simplified data includes a URL to access to acquire content body data, and that the method further has a step of gaining access to the URL to acquire the content body data corresponding to the content simplified data. According to this method, it is possible to obtain more detailed data than the content simplified data, i.e. the content body data.

In the data acquisition method of the invention, it is preferable that the method has a step of importing or exporting the content body data and/or the content simplified data to/from external memory. According to this method, it is possible to deliver and/or receive Toruca data to/from the external apparatus.

According to the invention, the content simplified data is transferred to the contactless card function section from the external apparatus, and stored in the storage section of the contactless card function control section operating on the operating system of the mobile terminal device, and it is thereby possible to operate the contactless card function content in conjunction with an application other than a specific application operating on the mobile terminal OS such as a Java (Trademark) application and BREW (Trademark) application.

DETAILED DESCRIPTION OF THE PREFERRED EMBODIMENTS OF THE INVENTION

The inventors of the invention noted that the IC card function does not work in conjunction with a mobile terminal operating system (OS) of a mobile terminal device, found out that by using the IC card function as a pipe to retrieve contactless card function content and delivering the contactless card function content to a processing section operating on the mobile terminal OS, it is possible to operate the contactless card function content in conjunction with an application other than a specific application operating on the mobile terminal OS such as a Java (Trademark) application and BREW (Trademark) application, and reached the invention.

In other words, it is a gist of the invention to transfer content simplified data to a contactless card function section from an external apparatus, store the content simplified data in a storage section of a contactless card function control section operating on an operating system of a mobile terminal device, and thereby enable the contactless card function content to operate in conjunction with an application other than a specific application operating on the mobile terminal OS.

Figure 1:
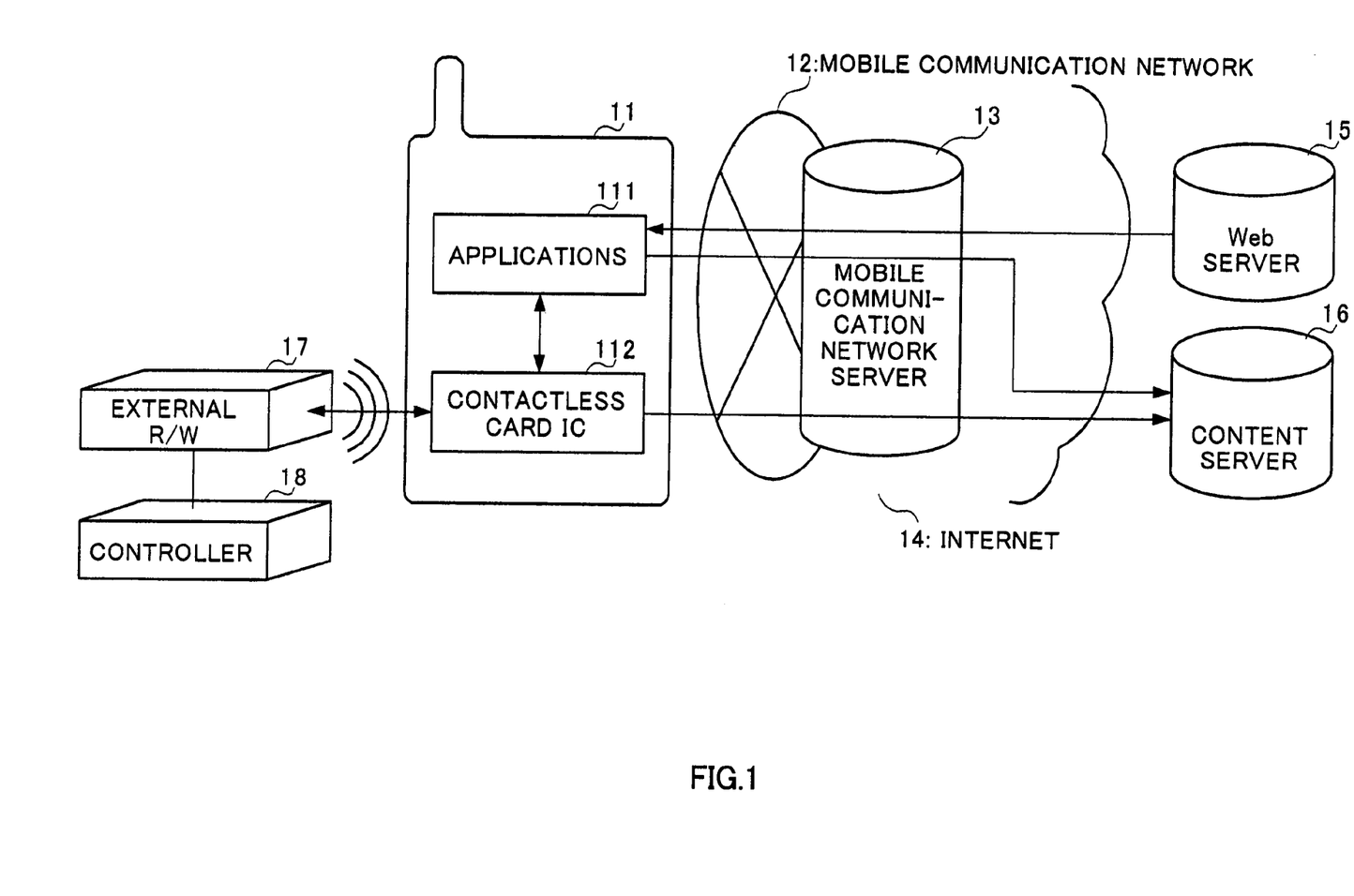
FIG. 1 is a diagram illustrating a schematic configuration of a contactless card function management system including a mobile terminal device according to one embodiment of the invention

FIG. 1 is a diagram illustrating a schematic configuration of a contactless card function management system including a mobile terminal device according to one embodiment of the invention The system as shown in FIG. 1 mainly has a mobile terminal (cellular telephone) 11 according to the invention, a mobile communication network server 13 connected to the mobile terminal 11 via a mobile communication network 12, and a Web server 15 and a contactless card function content server 16 each connected to the mobile terminal 11 via a network such as the Internet 14.

The mobile terminal 11 has functions of being able to execute various applications 111 and contactless card function. Further, the mobile terminal 11 has a communication section (not shown) that is an acquiring section capable of transmitting and receiving information to/from an external reader/writer (R/W) 17. Furthermore, the mobile terminal 11 has an operating system (mobile terminal OS), and on the mobile terminal OS operate a browser function, viewer function, JAM (Java Application Manager) and other functions. The external R/W 17 is driven by a controller 18.

The contactless card function in the mobile terminal 11 is a function of being able to add contactless card e.g. proximity IC card function content, and the like, and for example, includes FeliCa (Trademark) or the like. In the invention, by the contactless card function, it is possible to acquire content simplified data of the contactless card function content from the external R/W 17. To implement the contactless card function, the mobile terminal 11 is installed with a controller for the contactless card function and contactless card IC 112.

The mobile communication network 12 is a network between the mobile terminal 11 and communication network server 13. The communication network 12 includes a mobile packet communication network, as well as the ordinary mobile communication network. The mobile communication network server is, for example, an i mode (Trademark) server, serves the gateway function of connecting the mobile communication network 12 and Internet 14, and more particularly, has the information distribution function, mail transmission/reception function, mail storage function, contract customer management function, information provider management function and information fee charging function.

The network includes the Internet 14, and other networks such as, for example, LAN, WAN and the like. The Web server 15 is a server on the Internet 14 that stores applications 111 to be downloaded to the mobile terminal 11.

The content server 16 stores content body data of respective pieces of contactless card function content provided from a plurality of service providers that provides the contactless card function content, while performing addition and deletion of the contactless card function content via the controller that implements the contactless card function and the network, initialization, and read and write of data. Further, the content server 16 is installed with an application for the content server 16 to execute processing on the controller that implements the contactless card function. In addition, the service provider may have the content server on the Internet 14 together with the Web server thereof, or may have the content server on a different network from the Internet 14, aside from the Web server thereof. For example, when the contactless card function is FeliCa, the content server 16 is a FeliCa server.

In the system with the above-mentioned configuration, after the communication section of the mobile terminal 11 detects a carrier from the external R/W 17, the communication section starts communication with the external R/W 17, and acquires content simplified data of the contactless card function content from the external R/W 17. The acquired content simplified data is transferred to the control section using the contactless card function content and stored. Further, in this system, by connecting to a URL contained in the content simplified data, the content body data of the contactless card function content corresponding to the content simplified data is downloaded and stored in the mobile terminal 11. In addition, this data acquisition is performed independently of the operation and state of the mobile terminal 11.

In this system, by the application 111, for example, i application (Trademark) in the mobile terminal 11 starting processing, the contactless card IC 112 and content server 16 on the network communicate with each other, and it is thus possible to acquire the content body data from the content server 16.

In addition, in the system with the above-mentioned configuration, it is possible to perform information distribution, mail transmission/reception, mail storage, contract customer management, information provider management and information fee charging, but to simplify the descriptions, specific procedures thereof and the like are not described herein.

Figure 2:
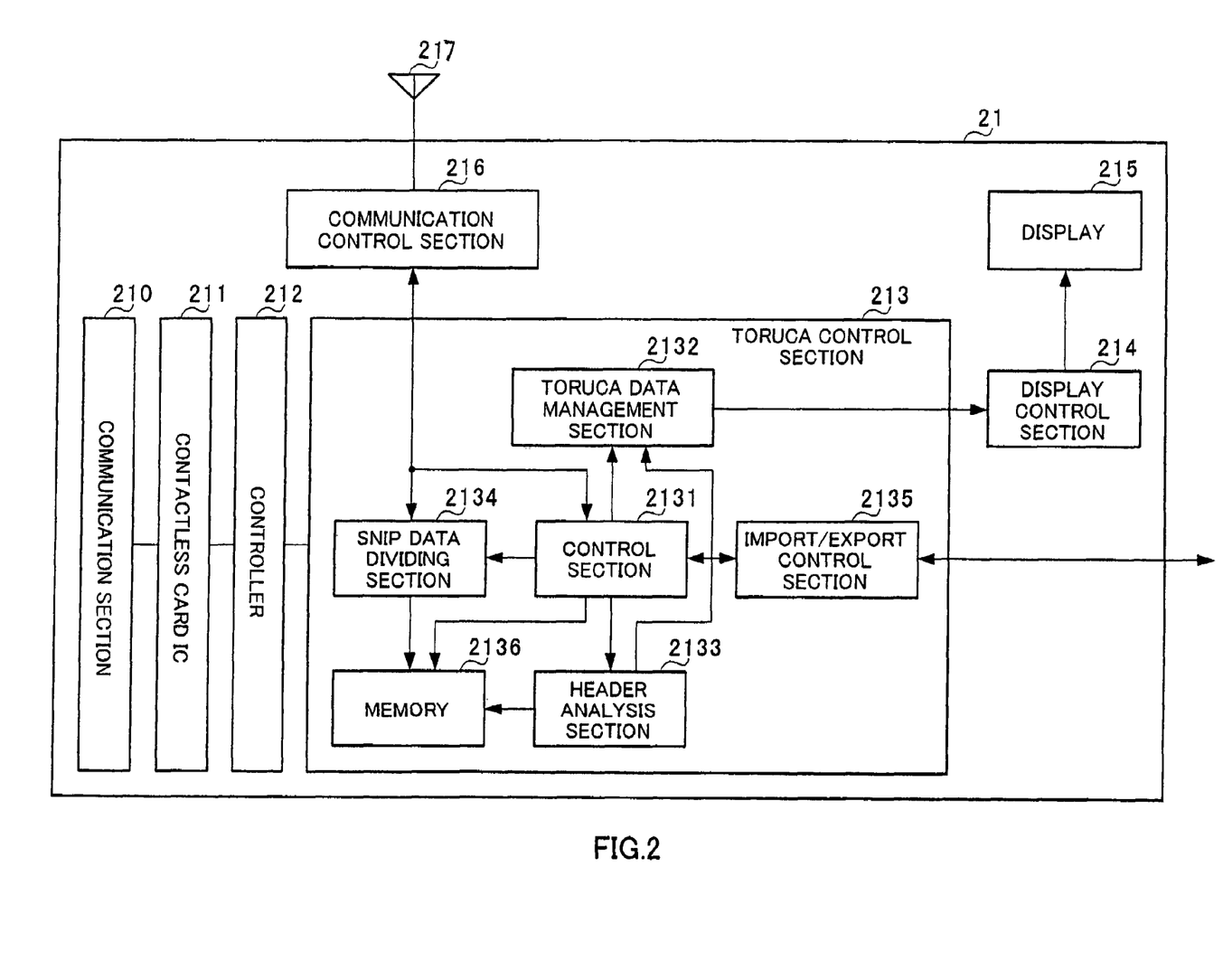
FIG. 2 is a block diagram illustrating a schematic configuration of the mobile terminal device according to one embodiment of the invention.

FIG. 2 is a block diagram illustrating a schematic configuration of the mobile terminal device according to one embodiment of the invention. In addition, the configuration as shown in FIG. 2 is simplified to explain the invention, and is assumed to have structural elements installed in a typical mobile terminal device. Further, described herein is a case that the contactless card function content is Toruca content (including the content simplified data and content body data).

The mobile terminal 21 as shown in FIG. 2 has a communication section 210 that acquires content simplified data (Toruca snip data) of Toruca content from an external R/W, contactless card IC 211 that performs buffering on the content simplified data, controller (FeliCa operating system) 212 to implement the contactless card function, Toruca control section 213 that operates on the mobile terminal OS of the mobile terminal 21 and that performs various kinds of control to use Toruca data, display control section 214 that controls display of the Toruca content, display 215 that displays characters, image and video subjected to display control, communication control section 216 that controls communication with the external R/W or the network, and antenna 217.

The communication section 210 acquires the Toruca snip data and/or application starting information by instruction from the external R/W when the mobile terminal 21 is held over the external R/W to buffer in the contactless card IC 211.

The controller 212 delivers the Toruca snip data and/or application starting information buffered in the contactless card IC 211 to a predetermined processing section. In other words, the controller 212 has a header identifying section, and identifies a header added to the data such as the Toruca snip data, application starting information and the like acquired from the external R/W to send to the predetermined processing section. For example, when the data acquired from the external R/W is the Toruca snip data, the controller 212 sends the data to Toruca control section 213. When the data acquired from the external R/W is the application starting information, the controller 212 sends the data to a JAM (Java Application Manager, not shown).

As shown in FIG. 2, the Toruca control section 213 includes a control section 2131 that controls the entire processing section, Toruca data management section 2132 that manages the Toruca snip data and the Toruca body data (both referred to as Toruca data) corresponding to the attribute of the Toruca content, header analysis section 2133 that analyzes a header added to the Toruca data, snip data dividing section 2134 that divides the Toruca snip data attached to an e-mail, import/export control section 2135 that controls import or export of the Toruca body data and/or Toruca snip data from/to external memory, and the Toruca data.

Figure 3:
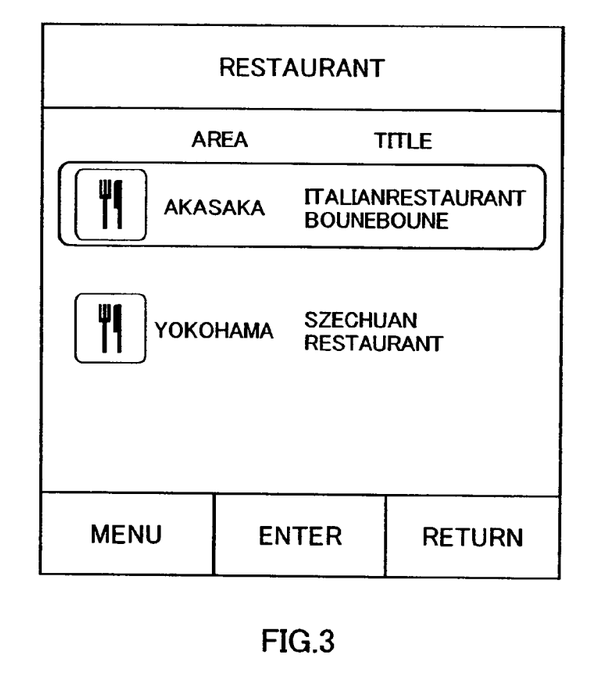
FIG. 3 is a diagram showing a display example of Toruca snip data in the mobile terminal device according to one embodiment of the invention
Figure 4:
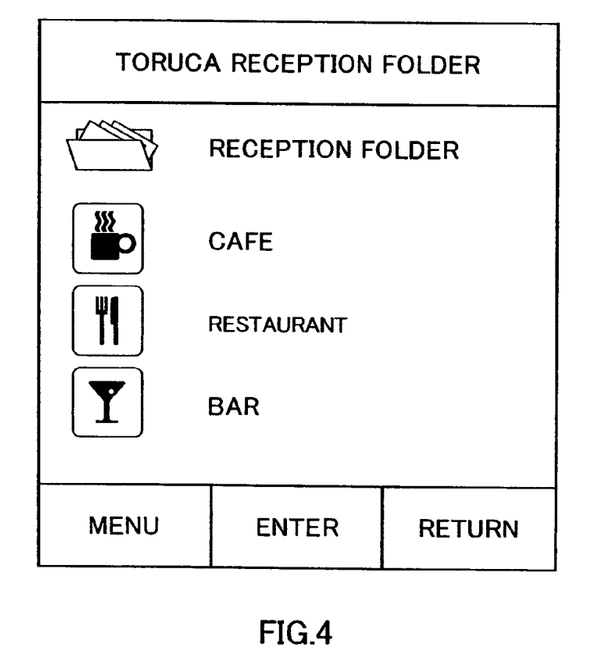
FIG. 4 is a diagram showing a display example of Toruca data in the mobile terminal device according to one embodiment of the invention

The Toruca data management section 2132 manages the Toruca data corresponding to the attribute of the Toruca data such as, for example, a category, location and the like. Further, the Toruca data management section 2132 performs sort processing and search processing according to the attribute. In this case, the Toruca data management section 2132 preferably manages the Toruca data using an arbitrary code, such as an icon code, regional code and the like, corresponding to the Toruca content. Associating the arbitrary code with the attribute of the Toruca data facilitates the sort processing and search processing. For example, as shown in FIG. 3, by associating an icon representing a restaurant with a title (name of the restaurant), the user is capable of visually identifying that the Toruca snip data is of restaurant. Further, by managing by icon code, it is possible to reduce the data amount of managed data. Furthermore, using various kinds of icons, as shown in FIG. 4, it is possible to perform an easily viewable display for the user on the screen. Thus managed Toruca data is subjected to display control in display control section 214, and then, displayed in the display 215.

The header analysis section 2133 analyzes a header added to the Toruca data, and stores the Toruca data in a predetermined storage area of memory 2136. The header added to the Toruca data includes an identifier indicating at least that the data is the Toruca data, version information indicating a version of the Toruca data, and Toruca type information indicating whether the data is the Toruca snip data or Toruca body data. For example, the header analysis section 2133 analyzes the header, and when identifying that the Toruca data is Toruca snip data, stores the data in a Toruca snip data storage area of the memory 2136, while storing the data in a Toruca body data storage area of the memory when identifying that the Toruca data is the Toruca body data. Furthermore, the header analysis section 2133 updates the Toruca data stored in the memory 2136 when necessary based on the version information of the header.

The snip data dividing section 2134 divides the Toruca snip data to store in the memory 2136, when the Toruca snip data is attached to an e-mail received in the communication control section 216 via the antenna 217. Further, the snip data dividing section 2134 has a function of attaching the Toruca snip data to an e-mail. In addition, this function may be provided in the communication control section 216 having the mailer function.

The import/export control section 2135 controls the processing of exporting the Toruca data in external memory such as a storage medium and the like, for example, CD, DVD or the like, and importing the Toruca data from external memory. It is thus made possible to receive and deliver the Toruca data from/to an external apparatus.

Figure 5:
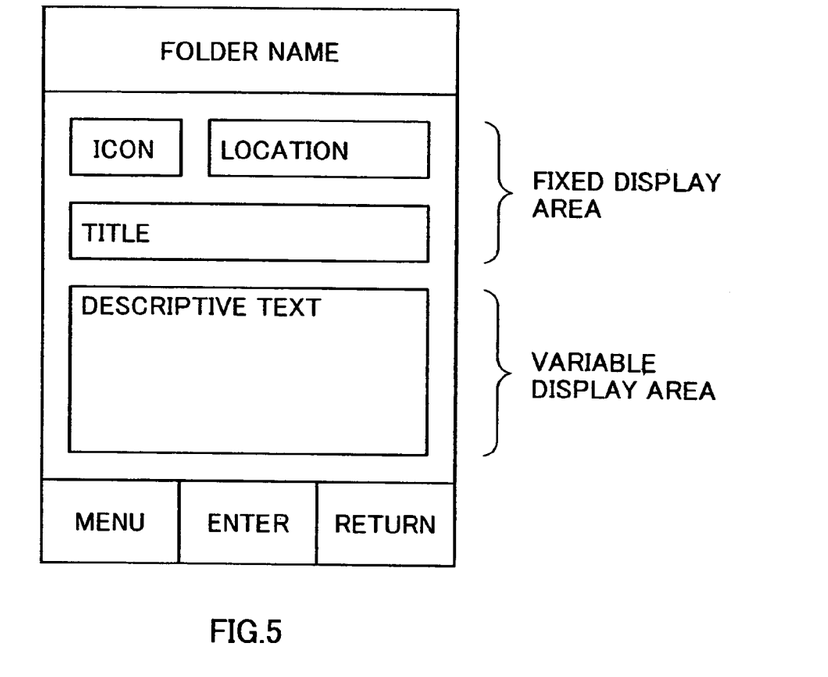
FIG. 5 is a diagram showing a display area example of the Toruca snip data in the mobile terminal device according to one embodiment of the invention
Figure 6:
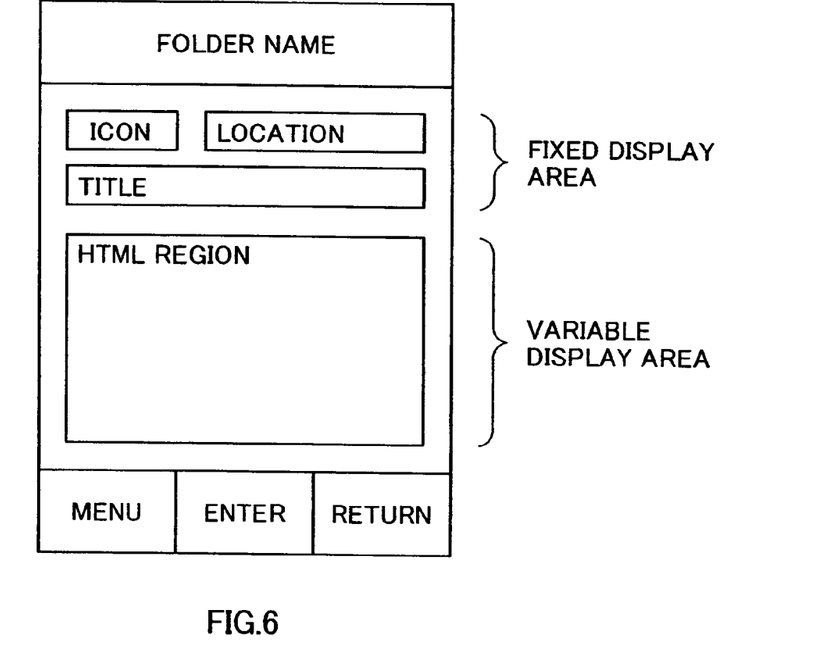
FIG. 6 is a diagram showing a display area example of Toruca body data in the mobile terminal device according to one embodiment of the invention

The display control section 214 has the viewer function, and displays the acquired Toruca data in the display 215. Further, the display control section 214 formats the Toruca data in predetermined display form to display in the display 215. The Toruca snip data is displayed in a layout as shown in FIG. 5. In the layout as shown in FIG. 5, a fixed display area and variable display area are included, and the fixed display area describes information of a location, title and the like, while the variable display area describes a brief explanation on the title. The brief explanation includes a URL to access to acquire the Toruca body data. The Toruca body data is displayed in a layout as shown in FIG. 6. Also in the layout as shown in FIG. 6, a fixed display area and variable display area are included, and the fixed display area describes information of a location, title and the like, while the variable display area describes detailed explanations on the title. The detailed explanations include a related link URL, telephone number, e-mail address and the like.

The communication control section 216 performs control of wireless communication between the mobile terminal 21 and another mobile terminal device or other communication apparatus. For example, the communication control section 216 receives a radio signal from the antenna 217, while transmitting a signal to transmit to another mobile terminal or other communication apparatus via the antenna 217. The communication control section 216 has the browser function and mailer function. Accordingly, the communication control section 216 connects to the URL that is to access to acquire the Toruca body data and that is contained in the Toruca snip data, and downloads the Toruca body data. Further, the communication control section 216 is capable of downloading the Toruca body data from the Web by the browser function. Furthermore, the communication control section 216 has a function of linking to the Web from the URL contained in the Toruca body data, a function of originating a call from a telephone number contained in the Toruca body data, and a function of transmitting an e-mail from an e-mail address contained in the Toruca body data. Moreover, the Java (Trademark) application and browser perform communication via the communication control section 216 using commands required for the communication, for example, API (Application Program Interface), and are able to read content data to transfer to another application when the content data itself is contained in the application, and to gain access to a predetermined site to acquire the Toruca data based on the URL when the URL is described. In addition, the communication control section 216 may have a configuration supporting optical communication, infrared communication, Bluetooth communication and the like.

Figure 7:
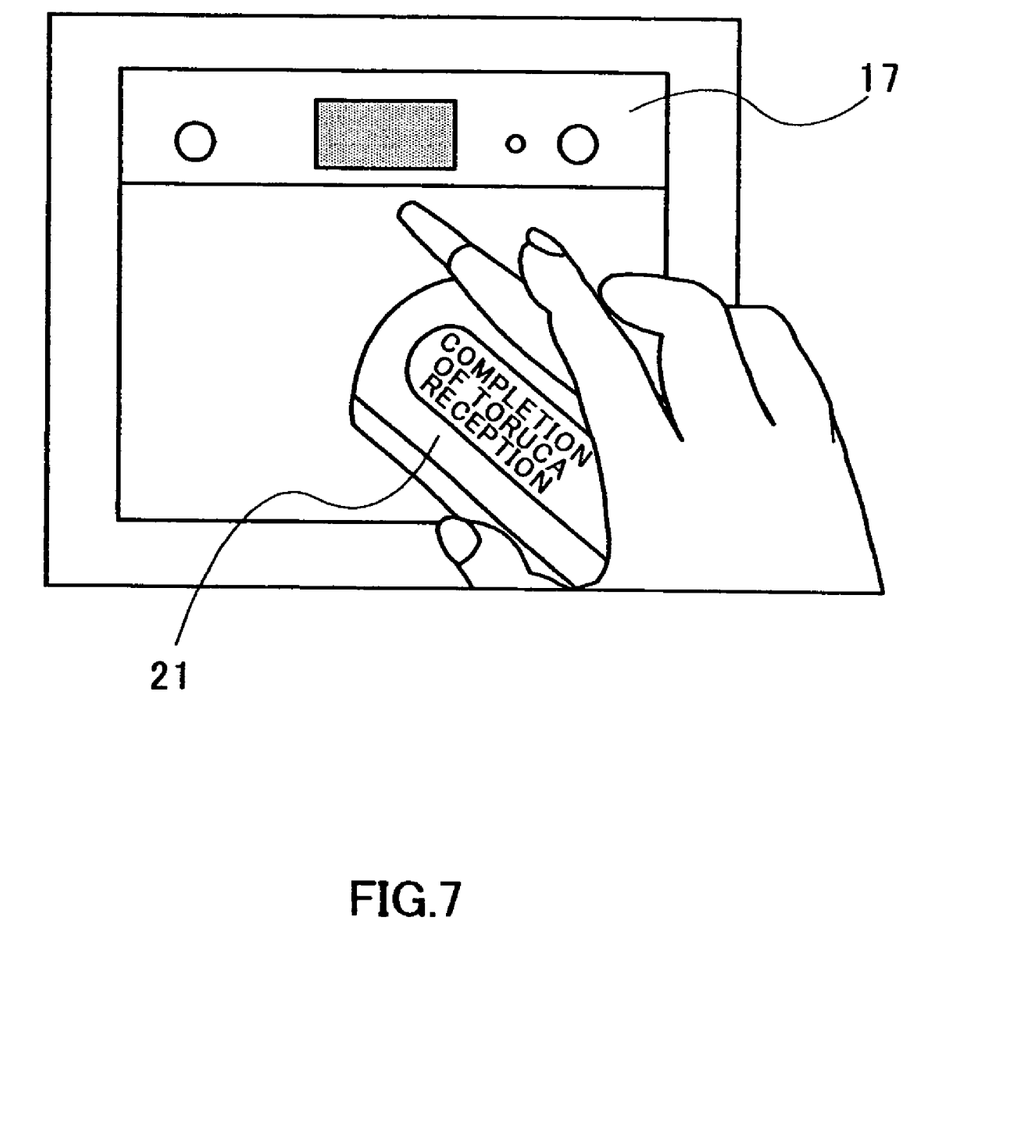
FIG. 7 is a diagram illustrating action to acquire the Toruca snip data using the mobile terminal
Figure 8:
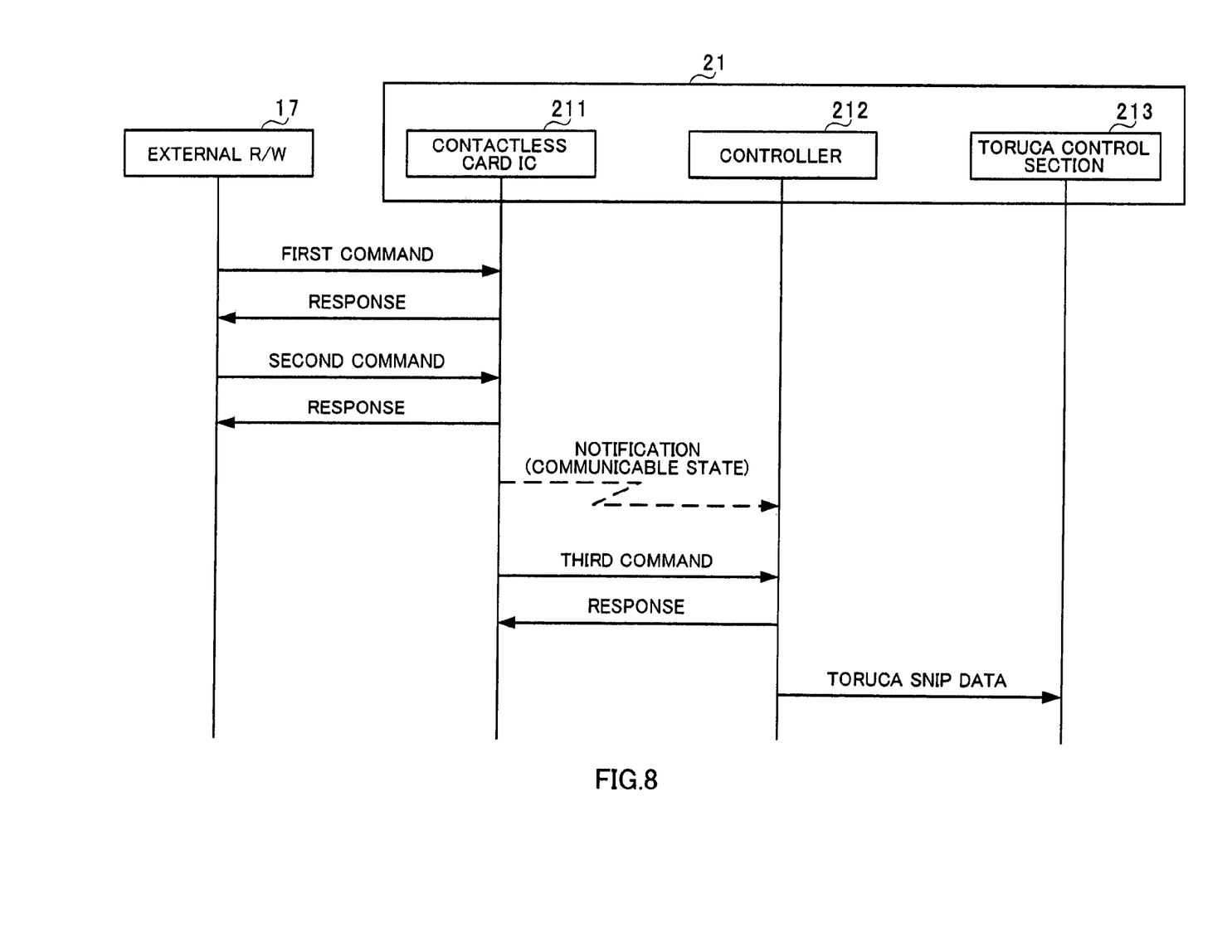
FIG. 8 is a diagram illustrating processing procedures in acquiring the Toruca snip data using the mobile terminal

Described next is acquisition of the Toruca snip data by the mobile terminal with the above-mentioned configuration. FIG. 7 is a diagram illustrating action to acquire the Toruca snip data using the mobile terminal. FIG. 8 is a diagram illustrating processing procedures in acquiring the Toruca snip data using the mobile terminal. In the data acquisition method according to the invention, the user holds the mobile terminal 21 over the external R/W 17, and stores the Toruca snip data in the mobile terminal 21.

The external R/W 17 modulates a predetermined carrier with the Toruca snip data, and always informs the information signal. As shown in FIG. 7, when the mobile terminal 21 is brought close to the external R/W 17, the contactless card IC 211 of the mobile terminal 21 detects the information signal via the communication section 210. Since the information signal is an electromagnetic wave, the contactless card IC 211 is activated by the electromagnetic wave. Then, the external R/W 17 transmits a first command (Push Command), and the information signal is buffered in a buffer in the contactless card IC 211 in the mobile terminal 21. When the buffering is completed, the contactless card IC 211 transmits a response signal to the external R/W 17.

Next, the external R/W 17 transmits a second command (Activate2 command) to switch between interfaces of the contactless card IC 211. The contactless card IC 211 switches the interface capable of receiving the information signal to a serial interface, and transmits a response signal to the external R/W 17. Further, the contactless card IC 211 notifies the controller 212 of the communicable state.

The controller 212 transmits a third command (Pull Command), and acquires the information signal from the buffer in the contactless card IC 211. Upon acquiring the information signal, the controller 212 outputs a response signal to the contactless card IC 211. The controller 212 transfers the acquired information signal i.e. the Toruca snip data to the Toruca control section 213. The Toruca control section 213 stores the Toruca snip data in the memory 2136.

In addition, since the controller 212 has the header identifying section, the controller 212 identifies a header added to the information signal, and when the information signal is the Toruca snip data, outputs the Toruca snip data to the Toruca control section 213 as described above, while transferring the data to another processing section as appropriate when the information is other data.

In addition, when the information signal from the external R/W 17 is application starting information or browser starting information, the external R/W 17 transfers the information signal to the mobile terminal 21 in the same sequence as described above, a request to start the application or request to start the browser is made based on the information signal, and startup of the application or startup of the browser is performed on the mobile terminal OS, respectively.

The Toruca snip data acquired from the external R/W as described is made of only the data that is extremely simplified to facilitate reception and delivery of the data. Accordingly, when the user wants to acquire more detailed content on the Toruca content, the user acquires the Toruca body data via the Internet. This work is referred to as "Toruca content (card) materialization".

FIG. 9 is a diagram to explain materialization of the Toruca content. FIG. 10 is a diagram illustrating a screen display example in downloading the Toruca body data.

Figure 9A:
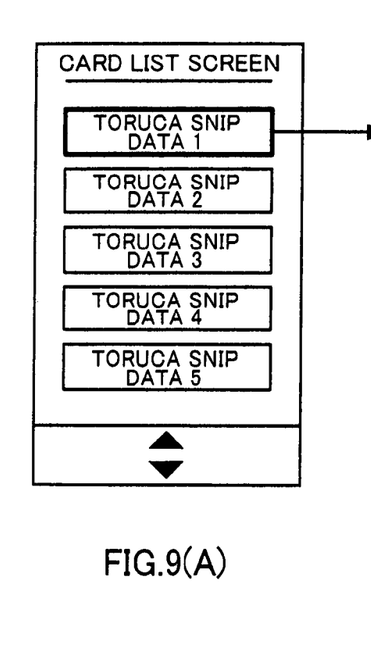
FIG. 9 is a diagram to explain materialization of Toruca content; an FIG. 10 is a diagram illustrating a screen display example in downloading the Toruca body data.
Figure 9B:
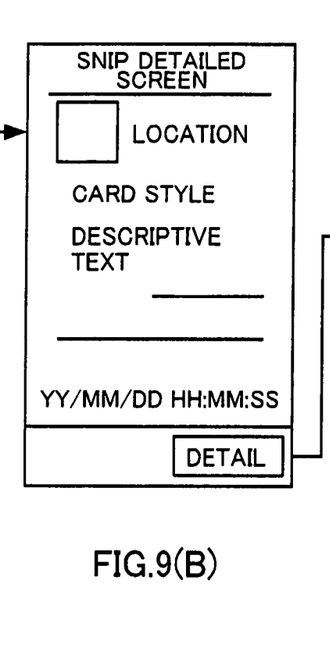
Figures 9C, 9D:
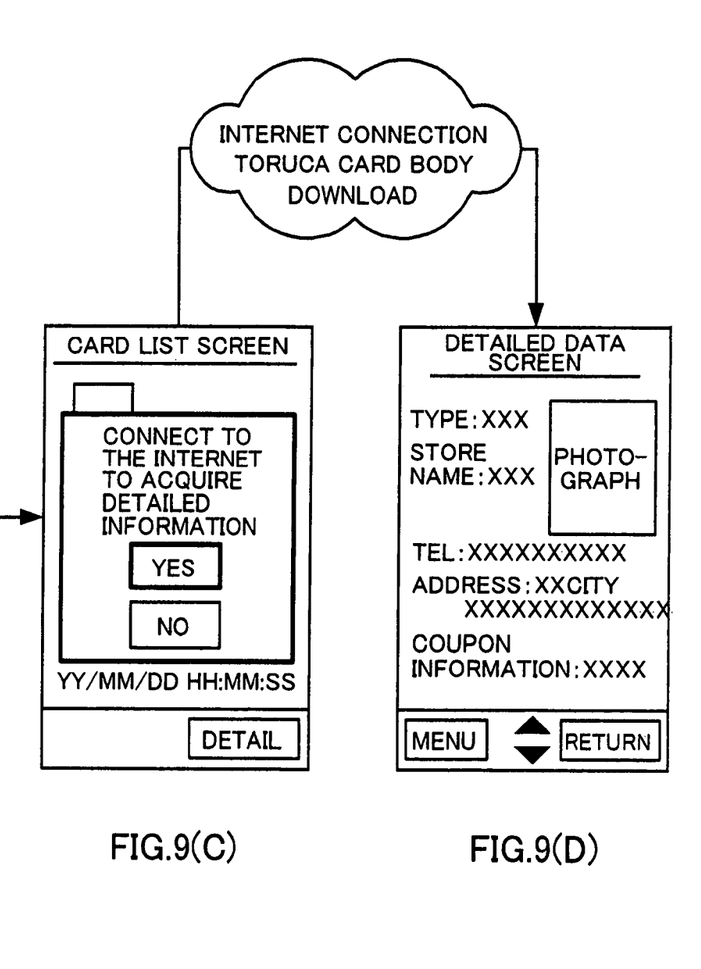
Figure 10A:
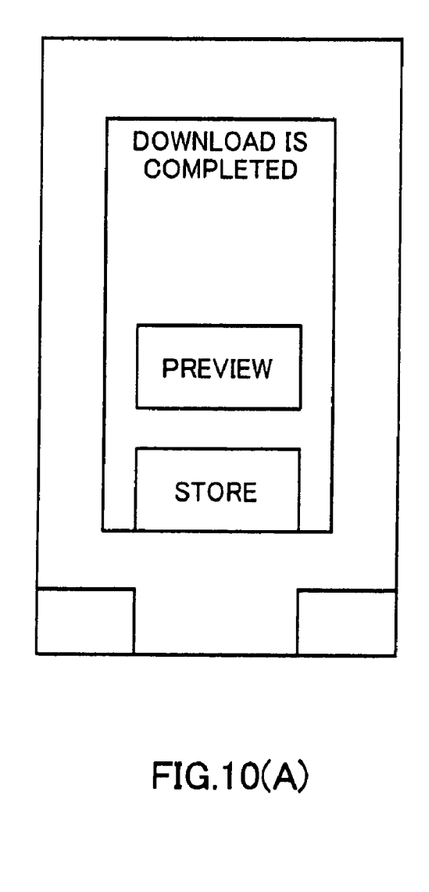
Figure 10B:
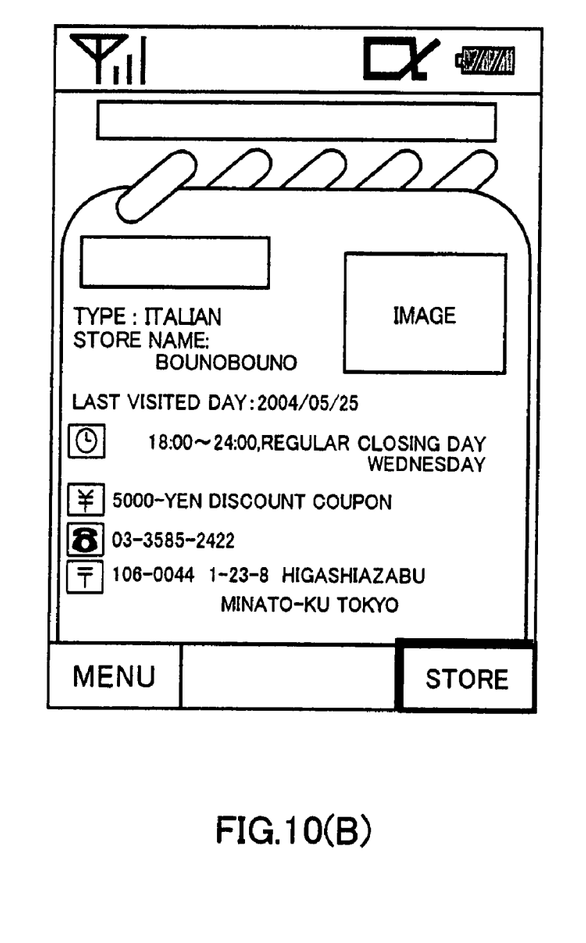
Figure 10C:
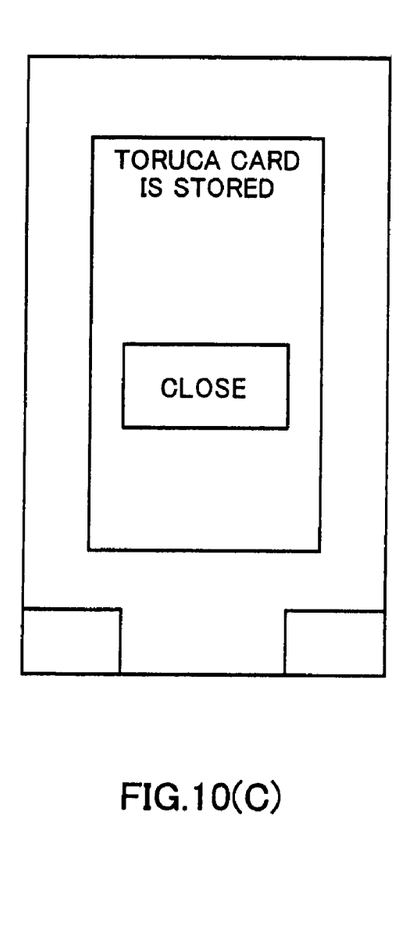

When performing materialization of the Toruca content, first, as shown in FIG. 9(a), a snip to materialize i.e. to obtain detailed information is selected from a list display screen of the acquired Toruca snip data. When the snip is selected, as shown in FIG. 9(b), the detailed screen of the snip is displayed. When a "detail" button is pressed on the detail screen, as shown in FIG. 9(c), a check screen is displayed to acquire the Toruca body data. When a download is selected on the check screen, an Internet connection is made to access the URL contained in the Toruca snip data, the Toruca body data is downloaded, and a display is performed as shown in FIG. 9(d). More specifically, when the download is completed, the screen is displayed as shown in FIG. 10(a). Then, a preview button is pressed, the screen including detailed data is displayed as shown in FIG. 10(b). When a storage button is pressed on the screen as shown in FIG. 10(a), the screen is displayed as shown in FIG. 10(c).

Thus, according to the data acquisition method according to this embodiment, it is possible to deliver the Toruca snip data acquired from the external R/W to a processing section operating on the mobile terminal OS. It is thereby possible to operate the Toruca snip data in conjunction with an application other than a specific application operating on the mobile terminal OS such as the Java (Trademark) application and BREW (Trademark) application. Further, since the contactless card function is used as an interface of information communication, the need is eliminated of beforehand starting the specific application on the mobile terminal side, and it is also possible to acquire the data when the mobile terminal is OFF.

The present invention is not limited to the above-mentioned embodiment, and is capable of being carried into practice in various modifications thereof. For example, the invention is not limited to the constitution as explained in the above-mentioned embodiment, and is capable of being modified as appropriate to be carried into practice without departing from the scope of the invention. The above-mentioned embodiment describes the case that the contactless card function is FeliCa, but the invention is similarly applicable to cases that the contactless card function is any other contactless card function except the FeliCa. Further, the above-mentioned embodiment describes the case where the contactless card function content is Toruca content, but the invention is similarly applicable to cases where the contactless card function content is any other contactless card function content except the Toruca content.

The present application is based on Japanese Patent Application No. 2004-324798 filed on Nov. 9, 2004, entire content of which is expressly incorporated by reference herein.

The invention claimed is:

1. A mobile terminal device comprising:
a terminal body having an operating system;
a contactless card function section that is provided in the terminal body and that acquires contactless card function content from an external apparatus by contactless communication;
a contactless card function control section that operates on the operating system and that performs control to use the contactless card function content; and
a controller that identifies whether data acquired from the external apparatus is the contactless card function content and sends the contactless card function content to the contactless card function control section, wherein the contactless card function control section has a storage section that stores the contactless card function content and delivers the contactless card function content to a processing section operating on the operating system.

2. The mobile terminal device according to claim 1, wherein the contactless card function control section has a management section that performs management according to an attribute of the contactless card function content.

3. The mobile terminal device according to claim 2, wherein the management section manages the contactless card function content using an arbitrary code corresponding to the contactless card function content.

4. The mobile terminal device according to claim 1, wherein the contactless card function content has a header to identify content simplified data and content body data, and the contactless card function control section has a header analyzing section that analyzes the header, and based on an analyzed result of the header, stores the content simplified data in a content simplified data storage area of the storage section, while storing the content body data in a content body data storage area of the storage section.

5. The mobile terminal device according to claim 4, wherein the content simplified data includes a URL to access to acquire the content body data, the device has a communication control section to connect to the URL, and the storage section stores the content body data acquired by connecting to the URL.

6. The mobile terminal device according to claim 4, wherein the contactless card function control section has a section that performs control to import or export the content body data or the content simplified data to/from external memory.

7. A data acquisition method of acquiring contactless card function content from an external apparatus by contactless communication in a mobile terminal device having a contactless card function control section that performs control to use the contactless card function content, comprising the steps of:
identifying whether data acquired from the external apparatus is contactless card function content, and sending the contactless card function content to the contactless card function control section;
storing the contactless card function content; and
delivering the contactless card function content to a processing section operating on the operating system.

8. The data acquisition method according to claim 7, wherein the content simplified data includes a URL to access to acquire the content body data, and the method further comprises a step of gaining access to the URL to acquire the content body data corresponding to the content simplified data.

9. The data acquisition method according to claim 7, further comprising:
a step of importing or exporting the content body data or the content simplified data to/from external memory.

10. The data acquisition method according to claim 7, wherein the contactless card function content has a header to identify content simplified data and content body data, and in the step of storing the contactless card function content, the header is analyzed to store the content simplified data in a content simplified data storage area of a storage section, while storing the content body data in a content body data storage area of the storage section.

* * * * *